United States Patent
Oshima et al.

(10) Patent No.: US 7,602,152 B2
(45) Date of Patent: Oct. 13, 2009

(54) VEHICLE-USE POWER GENERATION CONTROL APPARATUS

(75) Inventors: Kenji Oshima, Okazaki (JP); Toshinori Maruyama, Anjo (JP); Nobuhito Okamoto, Chiryu (JP)

(73) Assignee: Denso Corporation, Kariya (JP)

( * ) Notice: Subject to any disclaimer, the term of this patent is extended or adjusted under 35 U.S.C. 154(b) by 217 days.

(21) Appl. No.: 11/703,145

(22) Filed: Feb. 7, 2007

(65) Prior Publication Data

US 2008/0074087 A1    Mar. 27, 2008

(30) Foreign Application Priority Data

Feb. 7, 2006    (JP) ............... 2006-030348

(51) Int. Cl.
*H02P 11/00* (2006.01)
*H02H 7/06* (2006.01)
*H02P 9/00* (2006.01)

(52) U.S. Cl. ....................................... 322/33
(58) Field of Classification Search .................... 322/33
See application file for complete search history.

(56) References Cited

U.S. PATENT DOCUMENTS

| | | | | |
|---|---|---|---|---|
| 3,898,439 A | * | 8/1975 | Reed et al. | 700/287 |
| 4,031,407 A | * | 6/1977 | Reed | 307/87 |
| 4,283,634 A | * | 8/1981 | Yannone et al. | 290/40 R |
| 4,308,463 A | * | 12/1981 | Giras et al. | 290/40 R |
| 4,380,146 A | * | 4/1983 | Yannone et al. | 60/790 |
| 4,536,126 A | * | 8/1985 | Reuther | 290/40 R |
| 4,686,446 A | | 8/1987 | Nishimura et al. | 322/33 |
| 5,198,744 A | | 3/1993 | Kohl et al. | 322/33 |
| 5,321,308 A | | 6/1994 | Johncock | 290/40 C |
| 5,982,155 A | * | 11/1999 | Rechdan et al. | 322/36 |
| 7,535,786 B1 | * | 5/2009 | Walker | 365/222 |
| 2008/0074087 A1 | * | 3/2008 | Oshima et al. | 322/34 |
| 2008/0094039 A1 | * | 4/2008 | Oshima | 322/28 |
| 2009/0058372 A1 | * | 3/2009 | Tsuzuki | 322/18 |
| 2009/0121689 A1 | * | 5/2009 | Kikuchi et al. | 322/34 |
| 2009/0146617 A1 | * | 6/2009 | Yoshida | 322/99 |

FOREIGN PATENT DOCUMENTS

| | | |
|---|---|---|
| DE | 41 02 335 A1 | 1/1992 |
| DE | 101 06 944 A1 | 9/2002 |
| EP | 0 178 395 A2 | 4/1986 |
| JP | A 60-051421 | 3/1985 |
| JP | A 04-229100 | 8/1992 |
| WO | WO 00/13304 | 3/2000 |

* cited by examiner

*Primary Examiner*—Nicholas Ponomarenko
*Assistant Examiner*—Pedro J Cuevas
(74) *Attorney, Agent, or Firm*—Oliff & Berridge, PLC (57) ABSTRACT

The vehicle-use power generation control apparatus for controlling an operation of a vehicle generator includes a temperature detecting circuit detecting a temperature of a predetermined place reflecting a temperature of the vehicle generator, and a power control circuit having a function of restricting, when the temperature detected by the temperature detecting circuit exceeds a predetermined reference temperature, a power generation amount of the vehicle generator at a predetermined change rate.

12 Claims, 6 Drawing Sheets

VEHICLE-USE POWER GENERATION CONTROL APPARATUS

CROSS-REFERENCE TO RELATED APPLICATION

This application is related to Japanese Patent Application No. 2006-30348 filed on Feb. 7, 2006, the contents of which are hereby incorporated by reference.

BACKGROUND OF THE INVENTION

1. Field of the Invention

The present invention relates to a vehicle-use power generation control apparatus.

2. Description of Related Art

It is known to improve heat resistance of a vehicle generator mounted within a high-temperature engine room by controlling the power generating operation of the vehicle generator such that components of the vehicle generator, especially a rectifier, a stator winding, and a bearing are prevented from excessively rising in temperature.

As such a control method, it is known to suppress the temperature rises of those components by restricting an excitation current when a temperature of a control apparatus operating to control the power generating operation of the vehicle generator exceeds a predetermined value (for example, refer to Japanese Patent Applications Laid-open No. 60-51421, and No. 4-229100).

However, since there is a temperature difference between the control apparatus and the components of the vehicle generator, which varies depending on the rotational speed and ambient temperature of the vehicle generator, for example, the conventional control method described above cannot always properly suppress the temperature rises of the components of the vehicle generator, and tends to unnecessary restrict the power generation amount of the vehicle generator. Especially, when a vehicle runs in an urban area, a charge and discharge balance could become worse, and an output voltage variation of the vehicle generator could become large, because the temperatures of the components of the vehicle generator frequently changes.

SUMMARY OF THE INVENTION

The present invention provides a vehicle-use power generation control apparatus for controlling an operation of a vehicle generator comprising:

a temperature detecting circuit detecting a temperature of a predetermined place reflecting a temperature of the vehicle generator; and a power control circuit having a function of restricting, when the temperature detected by the temperature detecting circuit exceeds a predetermined reference temperature, a power generation amount of the vehicle generator at a predetermined change rate.

According to the present invention in which, when the detected temperature exceeds the predetermined reference temperature, the power generation amount can be decreased, to thereby prevent the power generation amount from being excessively restricted. In addition, when the detected temperature falls below the predetermined reference temperature, the power generation amount can be increased. This makes it possible to prevent the power generation amount and accordingly a power generation torque from increasing rapidly, to thereby stabilize the rotation of the vehicle engine when the detected temperature returns to a normal range.

The function of the power control circuit may be configured to restrict the power generation amount of the vehicle generator at a rate depending on a difference between the temperature detected by the temperature detecting circuit and the predetermined reference temperature.

The power control circuit may stop, when the temperature detected by the temperature detecting circuit falls below the predetermined reference temperature, restricting the power generation amount, and increase the power generation amount at a predetermined change rate.

The vehicle-use power generation control apparatus may further comprise a switching element driven by the power control circuit to on/off control passage of an excitation current to an excitation winding of the vehicle generator so that an output voltage of the vehicle generator is regulated at a target voltage, and the power control circuit may be configured to variably adjust an upper limit of an on-time duty ratio of the switching element to vary the power generation amount irrespective of the output voltage. Alternatively, the power control circuit may be configured to variably adjust at least one of a value of the target voltage and an upper limit of the excitation current to vary the power generation amount irrespective of the output voltage.

The power control circuit may restrict the power generation amount at a rate proportional to a difference between the temperature detected by the temperature detecting circuit and the predetermined reference temperature.

Other advantages and features of the invention will become apparent from the following description including the drawings and claims.

PREFERRED EMBODIMENTS OF THE INVENTION

First Embodiment

Figure 1:
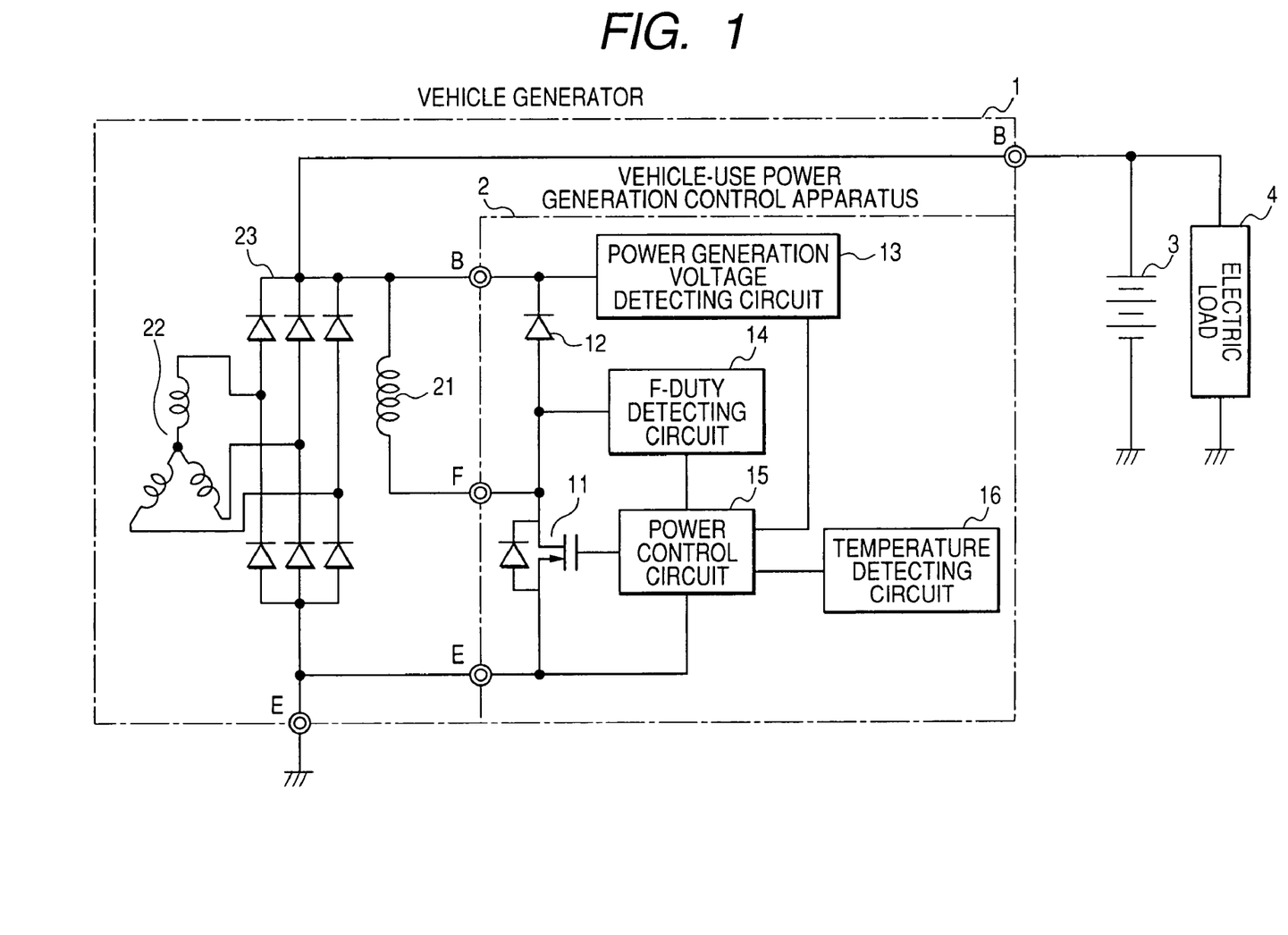
FIG. 1 is a diagram showing a structure of a vehicle generator including therein a vehicle-use power generation control apparatus according to a first embodiment of the invention.

FIG. 1 shows a structure of a vehicle generator 1 including therein a vehicle-use power generation control apparatus 2 according to a first embodiment of the invention.

As shown in this figure, the vehicle generator 1 includes an excitation winding 21, a stator winding 22, a rectifier 23, and the vehicle-use power generation control apparatus 2. The vehicle generator 1 is belt-driven by a vehicle engine (not shown). The excitation winding 21, which is wound around field magnetic poles (not shown) to constitute a stator, generates a rotating magnetic field when applied with an excitation current. The stator winding 22, which is a multi-phase winding (three-phase winding in this embodiment), is wound around a stator core (not shown) to constitute a stator. The stator winding 22 generates an electromotive force thereacross depending on the rotating magnetic field generated by the excitation winding 21 as an AC output. This AC output is supplied to the rectifier 23 to be full-wave rectified. The output of the rectifier 23 is supplied to a battery 3 and an electric load 4 as an output of the vehicle generator 1. The output amount of the vehicle generator 1 (referred to as "power generation amount" hereinafter), which depends on the rotational speed of the rotor and the value of the excitation current flowing through the excitation winding 21, is controlled by the vehicle-use power generation control apparatus 2.

Next, details of the vehicle-use power generation control apparatus 2 are explained. The vehicle-use power generation control apparatus 2 includes an excitation drive transistor 11, a fly-wheel diode 12, a power-generation voltage detecting circuit 13, an F-duty detecting circuit 14, a power control circuit 15, and a temperature detecting circuit 16.

The excitation drive transistor 11 is a MOSFET serving as a switching element that has a gate connected to the power control circuit 15, a drain connected to an output terminal (B-terminal) of the vehicle generator 1 through the fly-wheel diode 12, and a source that is grounded through an E-terminal. The drain of the excitation drive transistor 11 is also connected to the excitation winding 21 through an F-terminal. When the excitation drive transistor 11 is turned on, the excitation current is passed to the excitation winding 21. When the excitation drive transistor 11 is turned off, the passage of the excitation current is stopped. The fly-wheel diode 12 is series-connected to the excitation winding 21, so that when the excitation drive transistor 11 is turned off, a surge current is allowed to circulate in the excitation winding 21 through the fly-wheel diode 12. The power-generation voltage detecting circuit 13 is for detecting the output voltage (power-generation voltage) of the vehicle generator 1 appearing at the B-terminal. The F-duty detecting circuit 14 is for detecting an excitation duty (F-duty), or the on-time duty ratio of the excitation drive transistor 11. The detection of the F-duty is performed by monitoring the voltage appearing at the F-terminal connected to the excitation drive transistor 11. The power control circuit 15, which on/off-controls the excitation drive transistor 11, performs a power-generation amount restriction control on the basis of a temperature detection result by the temperature detecting circuit 16. The temperature detecting circuit 16 detects a temperature of a predetermined portion of the vehicle-use power generation control apparatus 2 (referred to as "temperature-detectable portion" hereinafter) reflecting a temperature of the vehicle generator 1. The temperature detecting circuit 16 uses a sensor output (voltage output or current output) of a temperature sensor mounted to the temperature-detectable portion. The temperature-detectable portion is not necessarily limited to a specific portion of the vehicle-use power generation control apparatus 2. For example, it may be a place near the rectifier 23 or the stator winding 22 of the vehicle generator 1. The temperature sensor may be mounted to any component to be prevented from excessively rising in temperature.

Figure 2:
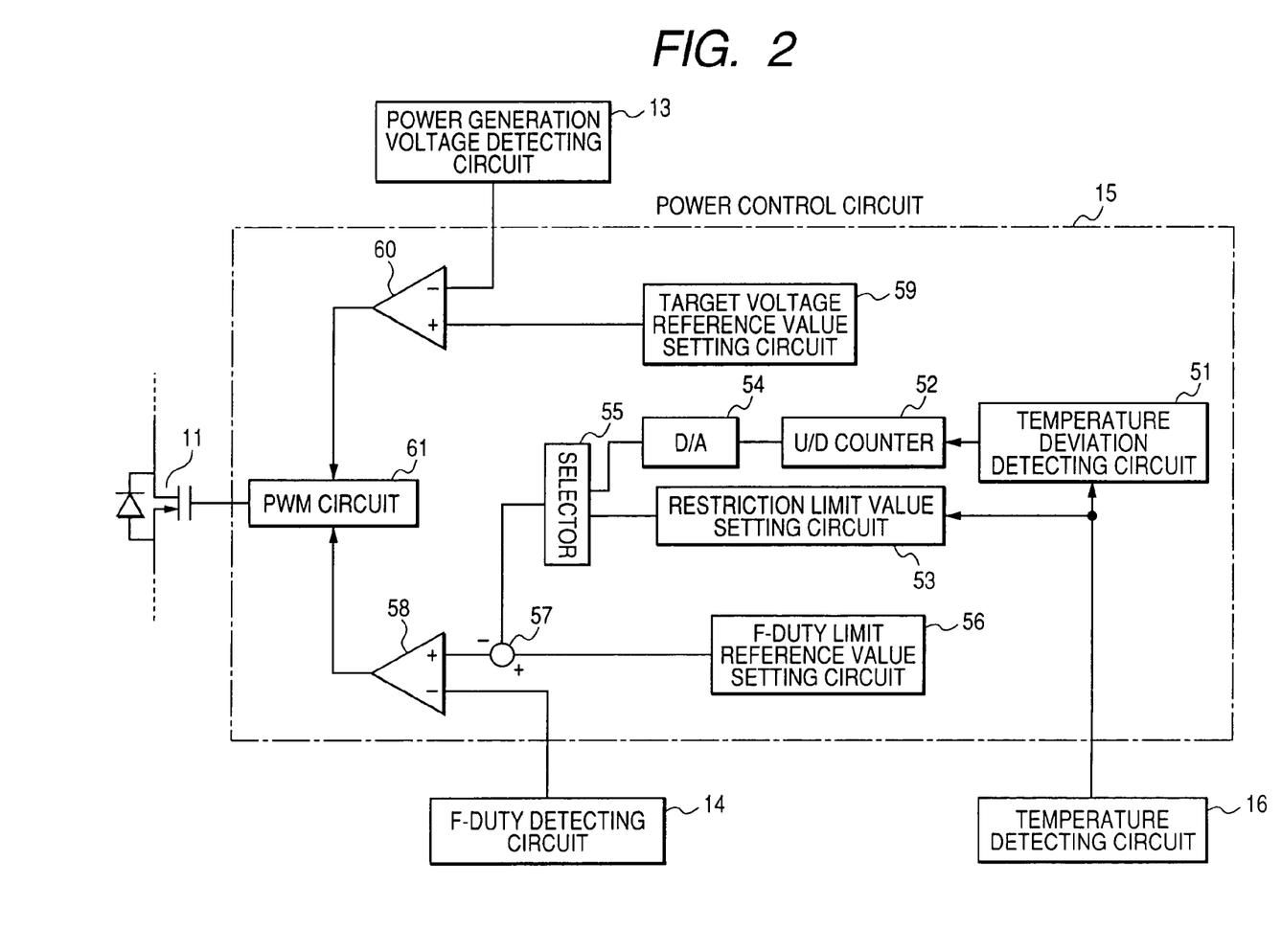
FIG. 2 is a diagram showing a structure of a power control circuit of the vehicle-use power generation control apparatus shown in FIG. 1.

FIG. 2 is a diagram showing a structure of the power control circuit 15 of the vehicle-use power generation control apparatus 2. As shown in this figure, the power control circuit 15 includes a temperature deviation detecting circuit 51, an U/D counter 52, a restriction limit value setting circuit 53, a D/A converter (digital-to-analog converter) 54, a selector 55, an F-duty limit reference value setting circuit 56, a subtracter 57, voltage comparators 58, 60, a target voltage reference value setting circuit 59, and a PWM circuit 61.

The temperature deviation detecting circuit 51 outputs, as a deviation amount, the temperature of the vehicle-use power generation control apparatus 2 itself detected by the temperature detecting circuit 16 and subtracted by a predetermined reference temperature. The U/D counter 52 performs an up/down counting at a rate depending on the deviation amount received from the temperature deviation detecting circuit 51. The count value of the U/D counter 52 defines a power-generation-amount restriction value. If the deviation amount is positive, that is if the temperature of the vehicle-use power generation control apparatus 2 is higher than the predetermined reference temperature, the U/D counter 52 performs an upcount operation at a rate proportional to the deviation amount. On the other hand, if the deviation amount is negative, that is if the temperature of the vehicle-use power generation control apparatus 2 is lower than the predetermined reference temperature, the U/D counter 52 performs a downcount operation at a rate proportional to an absolute value of the deviation amount. The rate at which the U/D counter 52 performs the upcount or downcount with respect to the deviation amount is predetermined with regard to a mutual relationship between the temperature of the vehicle-use power generation control apparatus 2 and a specific component of the vehicle generator 1, for example, the rectifier 23. Incidentally, the deviation amount is negative and the count value of the U/D counter is set at zero just when the vehicle generator 1 starts the power generation. When the deviation amount turns positive thereafter, the U/D counter 52 starts the upcount operation.

The D/A converter 54 generates a voltage value corresponding to the count value of the U/D counter 52. The selector 55 selects a smaller one of the voltage value outputted from the D/A converter 54 and an output value of the restriction limit value setting circuit 53. The output value of the restriction limit value setting circuit 53 defines a limit value of a restriction amount by which the power generation amount is restricted. If a state where the deviation amount is positive lasts for a long time, the power generation amount can become zero, because the count value of the U/D counter 52 continues to increase, and accordingly the power-generation-amount restriction value continues to increase. In view of suppressing the temperature rise of the vehicle generator 1, it is preferable to reduce the power generation amount as much as possible. However, in view of the charge and discharge balance, it is preferable to ensure a minimum amount of power generation. Hence, this embodiment is provided with the restriction limit value setting circuit 53 to make a compromise between these views. When the count value of the U/D counter 52 exceeds a value corresponding to the restriction limit value, the restriction of the power generation amount is not performed beyond the restriction limit value, because the selector 55 selects the restriction limit value.

The F-duty limit reference value setting circuit 56 sets an upper limit value of the F-duty (the on-time duty ratio of the excitation drive transistor 11) as an F-duty limit reference value. The subtracter 57 subtracts the output value of the selector 55 from the F-duty limit reference value outputted from the F-duty limit reference value setting circuit 56, and outputs it as an F-duty limit value. The voltage comparator 58, which receives the output value of the subtracter 57 at its positive input terminal and receives the output value of the F-duty detecting circuit 14 at its negative input terminal, outputs a high-level signal when the output value of the subtracter 57 is larger than the output value of the F-duty detecting circuit 14, and otherwise outputs a low-level signal.

The target voltage reference value setting circuit 59 outputs a voltage having a value corresponding to a target voltage of the vehicle generator 1. In a case where the power-generation voltage detecting circuit 13 is configured to detect the output voltage of the vehicle generator 1 divided down by an appropriate voltage dividing circuit, the target voltage reference value setting circuit 59 outputs the target voltage reference value multiplied by a division ratio of the voltage dividing circuit. The voltage comparator 60, which receives the output value of the target voltage reference value setting circuit 59 at its positive input terminal and the output value of the power generation voltage detecting circuit 13 at its negative input terminal, outputs a high-level signal when the output value of the target voltage reference value setting circuit 59 is lower than the output value of the power generation voltage detecting circuit 13, and otherwise outputs a low-level signal.

The PWM circuit 61 outputs a PWM signal (pulse-width modulated signal) whose duty ratio is increased while both the voltage comparators 58, 60 output a high-level signal, and is decreased while at least one of the voltage comparators 58, 60 outputs a low-level signal.

The operation of the vehicle-use power generation control apparatus 1 having the above explained configuration is explained below. As explained above, when the temperature of the vehicle-use power generation control apparatus 2 detected by the temperature detecting circuit 16 exceeds the predetermined reference temperature, the count value of the U/D counter 52 is increased at a rate proportional to the deviation amount (the temperature difference therebetween). As a result, the output value of the D/A converter 54 increases, and accordingly the power-generation-amount restriction value by which the F-duty limit reference value outputted from the F-duty limit reference value setting circuit 56 increases. If a state where the temperature of the vehicle-use power generation control apparatus 2 detected by the temperature detecting circuit 16 (referred to simply as "detected temperature" hereinafter) exceeds the predetermined reference temperature lasts for a long time, the power-generation-amount restriction value increases until it reaches the restriction limit value set by the restriction limit value setting circuit 53. In this case, the increasing rate increases with the increase of the deviation amount (the temperature difference between the detected temperature and the predetermined reference temperature). As a consequence of the increase of the power-generation-amount restriction value, the F-duty limit value decreases gradually. If the F-duty limit value outputted from the subtracter 57 becomes smaller than the F-duty of the excitation driver transistor 11 detected by the F-duty detecting circuit 14, the output of the voltage comparator 58 changes from high level to low level, as a result of which the PWM circuit 61 reduces the duty ratio of the PWM signal outputted therefrom irrespective of the output level of the voltage comparator 60. It results that the excitation current flowing through the excitation winding 21 decreases, to thereby restrict the power generation amount.

As understood from the above explanation, according to this embodiment in which, when the detected temperature exceeds the predetermined reference temperature, the power generation amount is decreased at a rate depending on the deviation amount therebetween, it is possible to prevent the power generation amount from being excessively restricted. In addition, when the detected temperature falls below the predetermined reference temperature, the power generation amount is increased at a rate depending on the deviation amount therebetween. Therefore, according to this embodiment, it is possible to prevent the power generation amount and accordingly a power generation torque from increasing rapidly to thereby stabilize the rotation of the vehicle engine when the detected temperature returns to a normal range.

In this embodiment, the F-duty limit value defining the upper limit of the F-duty (on-time duty ratio) of the excitation driver transistor 11 is variable. Accordingly, the reduction or increase of the power generation amount can be performed easily and reliably by setting the F-duty limit value to an appropriate value. It should be noted that the power control circuit 15 is configured to perform a gradual excitation control so that the duty ratio of the PWM signal outputted from the PWM circuit 61 changes only gradually. This makes it possible that the excitation current flowing through the excitation winding 21 decreases only gradually when the F-duty limit value increases at a rate depending on the deviation amount between the detected temperature and the predetermined reference temperature.

The counting rate of the U/D counter 52, which determines the restriction rate of the power generation amount is set proportional to the absolute value of the deviation amount between the detected temperature and the predetermined reference temperature. This makes it possible to vary the restriction amount of the power generation depending on the degree of temperature rise, to thereby rapidly lower the temperature of a specific component of the vehicle generator (the rectifier 23 or the stator winding 22, for example).

Figure 3:
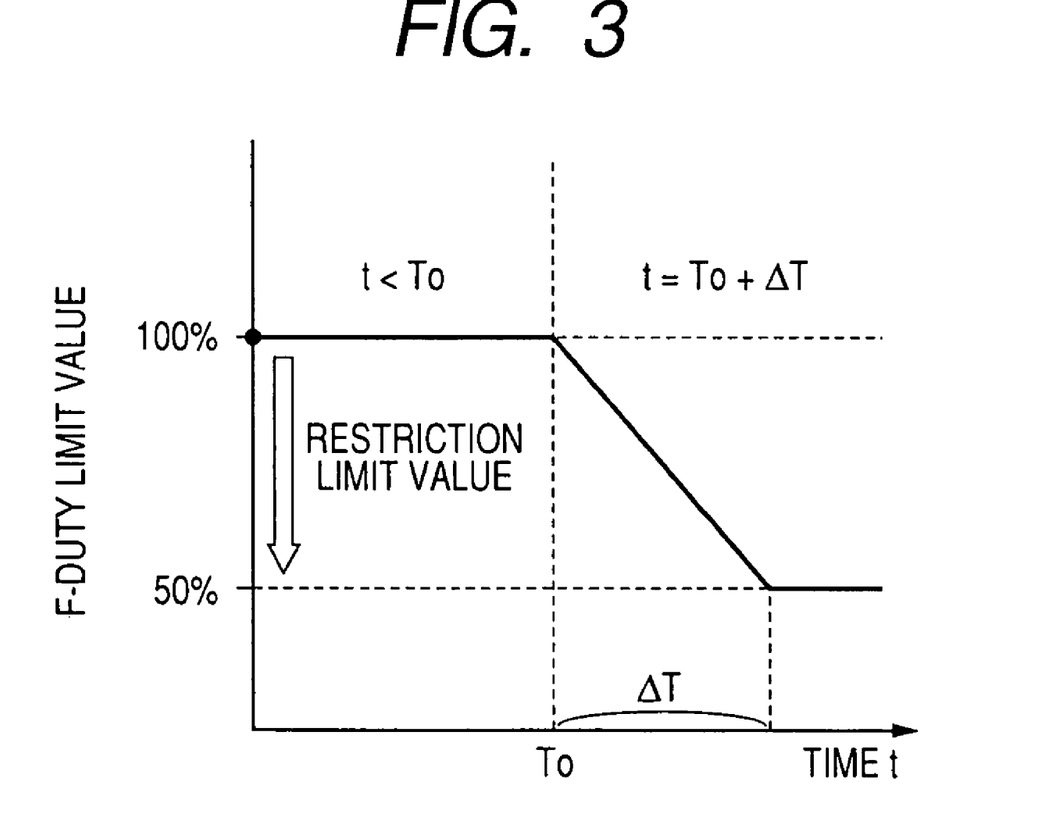
FIG. 3 is a diagram showing an example of a temporal change of an F-duty limit value when a power generation amount restriction control is performed.

FIG. 3 is a diagram showing an example of a temporal change of the F-duty limit value when the restriction of the power generation amount is started at time T0. In this example, it is assumed that the detected temperature exceeds the predetermined reference temperature at time T0, and the F-duty limit value is set at 100% (full excitation) before the start of the restriction of the power generation amount (t<T0), and at 50% after the start of the restriction of the power generation amount (T≧T0). As show in FIG. 3, when the deviation amount between the detected temperature and the predetermined reference temperature turns positive at time T0, the F-duty limit value (the output value of the subtracter 57) starts to gradually decrease. The time period ΔT over which the F-duty limit value decreases from 100% to 50% is set dependent on the counting rate of the U/D counter 52, that is dependent on the deviation amount between the detected temperature and the predetermined reference temperature. Therefore, as the detected temperature increases, the decreasing rate of the F-duty limit value increases, and accordingly the restriction amount of the generated power increases.

Second Embodiment

Figure 4:
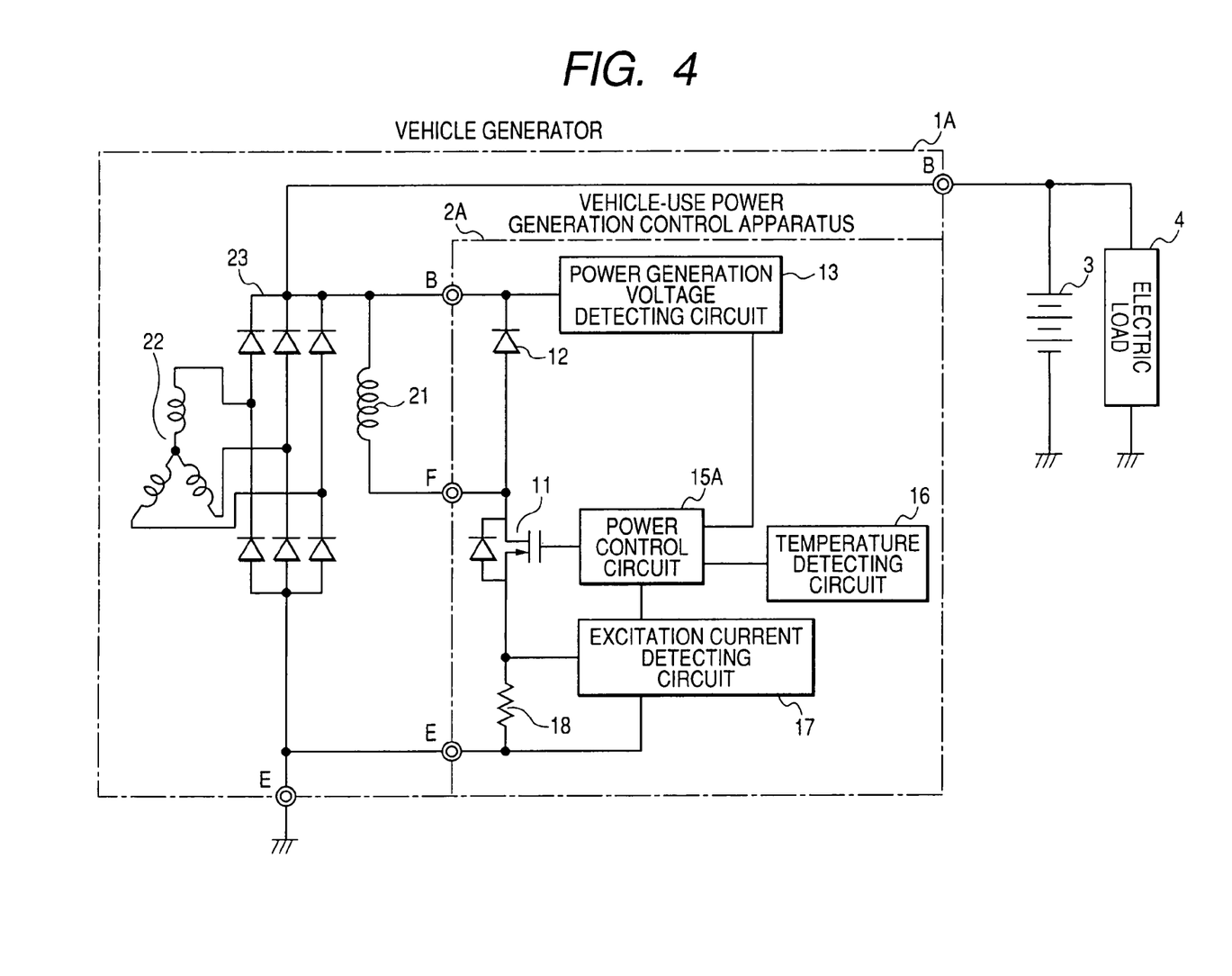
FIG. 4 is a diagram showing a structure of a vehicle generator including a vehicle-use power generation control apparatus according to a second embodiment of the invention.

FIG. 4 is a diagram showing a structure of a vehicle generator 1A including a vehicle-use power generation control apparatus 2A according to a second embodiment of the invention. The vehicle-use power generation control apparatus 2A is different from the vehicle-use power generation control apparatus 2 shown in FIG. 1 in that the F-duty detecting circuit 14 is replaced by an excitation current detecting circuit 17 and a sense resistor 18, and the power control circuit 15 is replaced by a power control circuit 15A. The power control circuit 15A performs, by on/off controlling the excitation drive transistor 11, the power-generation-amount restriction control on the basis of a detection result by the temperature detecting circuit 16 by variably adjusting a target voltage set value to which the output voltage of the vehicle generator 1A is regulated, and also a excitation current upper limit value defining an upper limit of the excitation current supplied to the excitation winding 21. The sense resistor 18, which is connected between the excitation drive transistor 11 and an E-terminal (ground terminal), generates thereacross a voltage proportional to the excitation current flowing through the excitation winding 21. The excitation current detecting resistor 17 reads the voltage across the sense resistor 18 and determines a value of the excitation current flowing through the excitation winding 21 on the basis of this read voltage.

Figure 5:
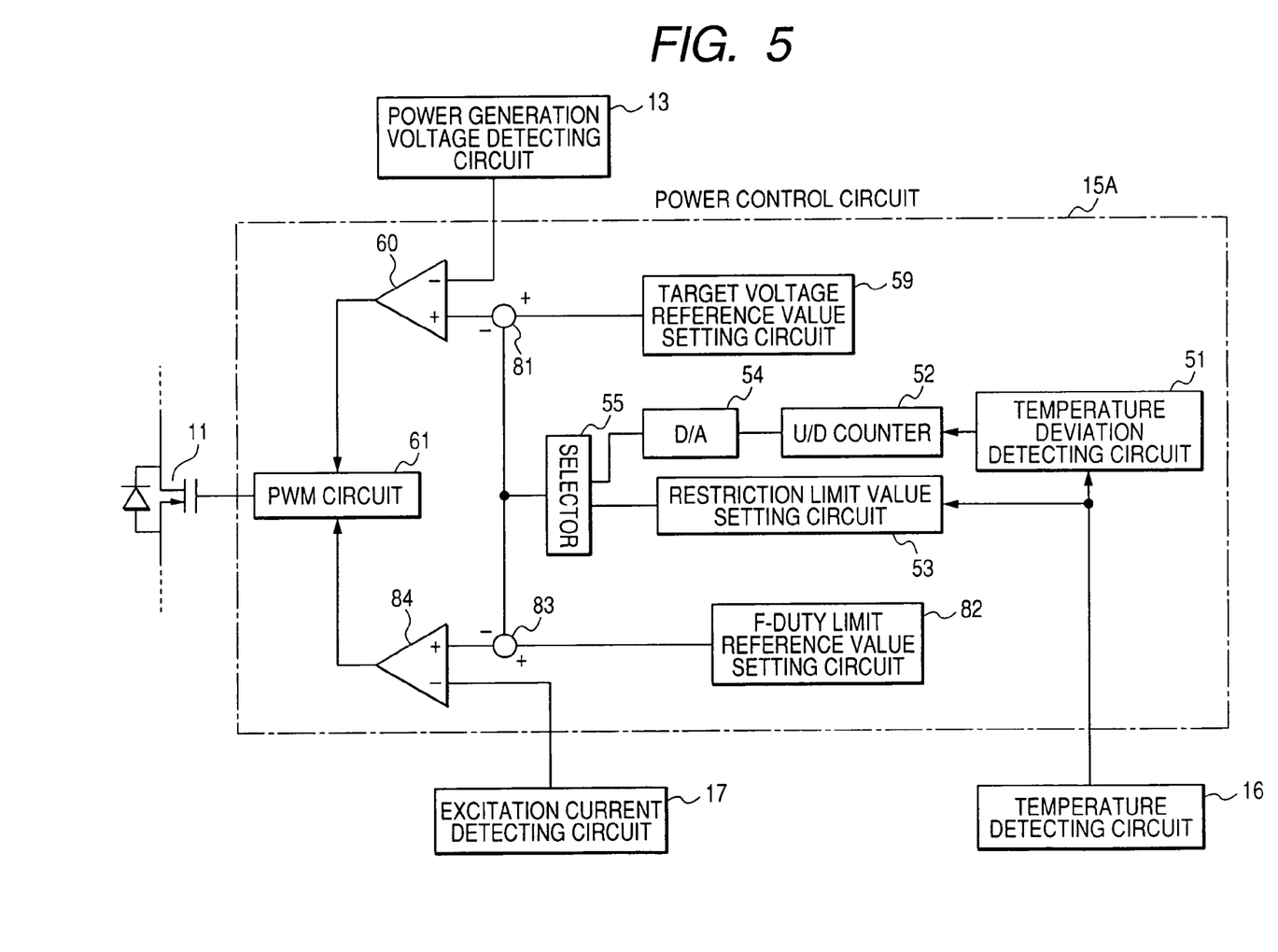
FIG. 5 is a diagram showing a structure of a power control circuit of the vehicle-use power generation control apparatus shown in FIG. 4.

FIG. 5 is a diagram showing a structure of the power control circuit 15A. As shown in this figure, the power control circuit 15A includes a temperature deviation detecting circuit 51, an U/D counter 52, a restriction limit value setting circuit 53, a D/A converter 54, a selector 55, a target voltage reference value setting circuit 59, voltage comparators 60, 84, a PWM circuit 61, subtracters 81, 83, and an excitation current limit reference value setting circuit 82. In FIG. 5, the components which function basically in the same ways as the components shown in FIG. 2 are given the same reference numerals, and explanation thereof will be omitted.

The temperature deviation detecting circuit 51, U/D counter 52, restriction limit value setting circuit 53, D/A converter 54, and selector 55 are used for outputting the F-duty limit value in the power control circuit 15 shown in FIG. 2, however, in this embodiment, they are used for outputting the target voltage set value and an excitation current limit value. Although the target voltage set value and the excitation current limit value are outputted from the same one set of these components in this embodiment, however, when it is required to adjust the target voltage set value and the excitation current limit value independently, two sets of these components may be provided.

The excitation current limit reference value setting circuit 82 sets an upper limit value of the excitation current to be supplied to the excitation winding 21 through the excitation drive transistor 11 as an excitation current limit reference value. The subtracter 83 subtracts the output value of the selector 55 (the power-generation-amount restriction value) from the output value of the excitation current limit reference value setting circuit 82, and outputs the subtraction result as the excitation current limit value. The voltage comparator 84, which receives the output value of the subtracter 83 at its positive input terminal and the output value of the excitation current detecting circuit 17 at its negative input terminal, outputs a high-level signal when the output value of the subtracter 83 is larger than the output value of the excitation current detecting circuit 17, and otherwise outputs a low-level signal.

The subtracter 81 subtracts the output value of the selector 55 from the output value of the target voltage reference value setting circuit 59 (target voltage reference value), and outputs the subtraction result as the target voltage set value. The voltage comparator 60, which receives the output value of the subtracter 81 at its positive input terminal and the output value of the power generation voltage detecting circuit 13 at its negative input terminal, outputs a high-level signal when the output value of the subtracter 81 is larger than the output value of the generation voltage detecting circuit 13, and otherwise outputs a low-level signal.

The operation of the vehicle-use power generation control apparatus 1A having the above explained configuration is explained below. If the detected temperature exceeds the predetermined reference temperature, the count value of the U/D counter 52 is increased at a rate proportional to the deviation amount (the temperature difference therebetween). As a result, the output value of the D/A converter 54 increases, and accordingly the power-generation-amount restriction value, by which the excitation current limit reference value outputted from the excitation current limit reference value setting circuit 82, and the target voltage reference value outputted from the target voltage reference value setting circuit 59 are respectively subtracted, increases. If a state where the detected temperature exceeds the predetermined threshold temperature lasts for a long time, the power-generation-amount restriction value increases until it reaches the restriction limit value set by the restriction limit value setting circuit 53. In this case, the increasing rate increases with the increase of the deviation amount (the temperature difference between the detected temperature and the predetermined reference temperature). As a consequence of the increase of the power-generation-amount restriction value, the excitation current limit value outputted from the subtracter 83 and the target voltage set value outputted from the subtracter 81 decrease gradually. If the excitation current limit value becomes smaller than the value of the excitation current detected by the excitation current detecting circuit 17, the output of the voltage comparator 84 changes from high level to low level, as a result of which the PWM circuit 61 reduces the duty ratio of the PWM signal outputted therefrom irrespective of the output level of the voltage comparator 60. It results that the excitation current flowing through the excitation winding 21 decreases, to thereby restrict the power generation amount. Likewise, if the target voltage set value becomes smaller than the power generation voltage (output voltage of the vehicle generator 1) detected by the power generation voltage detecting circuit 13, the output of the voltage comparator 60 changes from high level to low level, as a result of which the PWM circuit 61 reduces the duty ratio of the PWM signal outputted therefrom irrespective of the output level of the voltage comparator 84. It results that the excitation current flowing through the excitation winding 21 decreases, to thereby restrict the power generation amount.

As understood from the above explanation, according to this embodiment in which, when the detected temperature exceeds the predetermined reference temperature, the power generation amount is decreased at a rate depending on the deviation amount therebetween by adjusting either the excitation current limit value or the target voltage set value, it is possible to prevent the power generation amount from being excessively restricted. In this embodiment, since the excitation current limit value and the target voltage set value are variable, the reduction or increase of the power generation amount can be performed easily and reliably by setting them to appropriate values.

Figure 6:
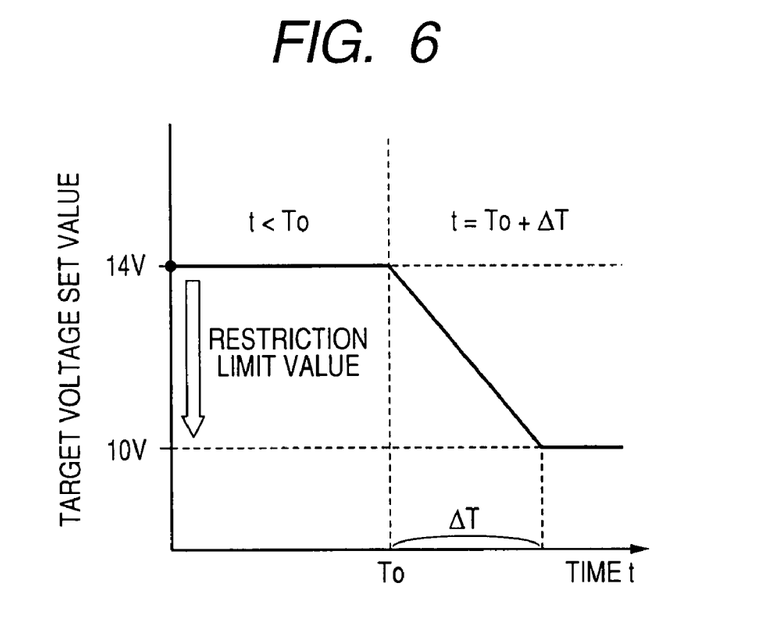
FIG. 6 is a diagram showing an example of a temporal change of a target voltage set value when the power generation amount restriction control is performed.

FIG. 6 is a diagram showing an example of a temporal change of the target voltage set value when the power generation amount restriction control is performed. This example shows a case where the target voltage reference value is set at a value corresponding to 14 V by the target voltage reference value setting circuit 59, the restriction limit value is set at a value corresponding to 4 V by the restriction limit value setting circuit 53, and the detected temperature exceeds the predetermined reference temperature at time T0. As shown in this figure, when the deviation amount turns positive at time T0, the target voltage set value (the output value of the subtracter 81) starts to gradually decrease to perform the power generation amount restriction control. The time period $\Delta T$ over which the target voltage set value decreases to 10 V (=14 V−4 V) is set dependent on the counting rate of the U/D counter 52, that is, dependent on the deviation amount between the detected temperature and the predetermined reference temperature. Therefore, as the detected temperature increases, the decreasing rate of the target voltage set value increases, and accordingly the restriction amount of the generated power increases.

Figure 7:
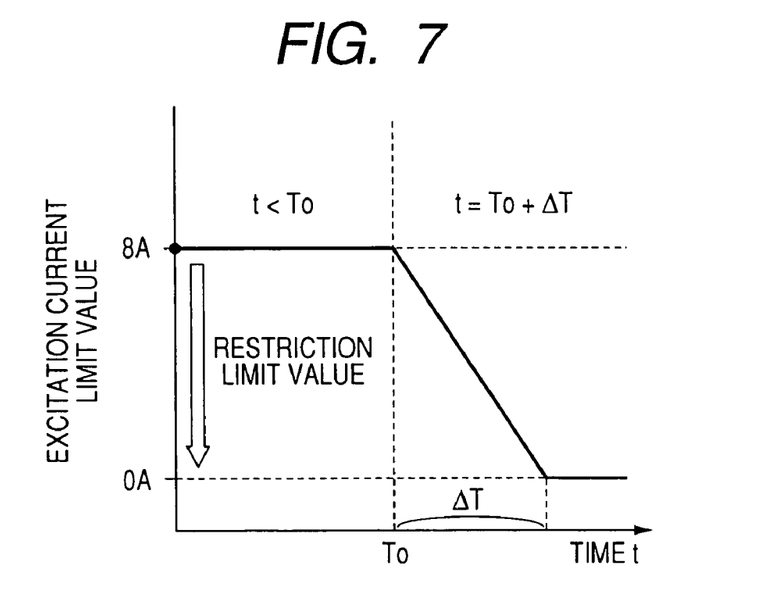
FIG. 7 is a diagram showing an example of a temporal change of an excitation current limit value when the power generation amount restriction control is performed.

FIG. 7 is a diagram showing an example of a temporal change of the excitation current limit value when the power generation amount restriction control is performed. In this example, it is assumed that the detected temperature exceeds the predetermined reference temperature at time T0. This example shows a case where the excitation current limit reference value is set at a value corresponding to 8 A by the excitation current limit reference value setting circuit 82, and the restriction limit value is also set at a value corresponding to 8 A by the restriction limit value setting circuit 53. As shown in this figure, the power generation amount restriction control is started at time T0 when the deviation value turns positive to gradually decrease the excitation current restriction value (the output value of the subtracter 83). The time period ΔT over which the excitation current limit value decreases to 0 A (=8 A−8 A) is set dependent on the counting rate of the U/D counter 52, that is, depending on the deviation amount between the detected temperature and the predetermined reference temperature. Therefore, as the detected temperature increases, the decreasing rate of the excitation current limit value increases, and accordingly the restriction amount of the generated power increases.

It is a matter of course that various modifications can be made to the above described embodiments as explained below. In the second embodiment, both the target voltage set value and the excitation current limit value are set variable to perform the power generation amount restriction control. However, the power generation amount restriction control can be performed by varying only one of them.

Although the PWM circuit 61 is used for gradually decreasing the excitation current flowing through the excitation winding 21 in each of the above described embodiments, the PWM circuit 61 may be replaced by a two-input AND circuit if the gradual excitation control need not be performed. In this case, the two-input AND circuit is turned on to allow the excitation current to pass to the stator winding 21 when both the two input terminals thereof are at high-voltage level.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power generation control apparatus for controlling an operation of a vehicle generator comprising:
   a temperature detecting circuit detecting a temperature of a predetermined place reflecting a temperature of said vehicle generator;
   a power control circuit that restricts a power generation amount of said vehicle generator such that said power generation amount gradually changes below a predetermined value at a change rate depending on said detected temperature, when said detected temperature exceeds a predetermined reference temperature; and
   a switching element driven by said power control circuit to on/off control passage of an excitation current to an excitation winding of said vehicle generator so that an output voltage of said vehicle generator is regulated at a target voltage, said power control circuit being configured to variably adjust an upper limit of an on-time duty ratio of said switching element to vary said power generation amount irrespective of said output voltage.

2. The vehicle-use power generation control apparatus according claim 1, wherein said power control circuit is configured to restrict said power generation amount of said vehicle generator at a rate depending on a difference between said detected temperature and said predetermined reference temperature.

3. The vehicle-use power generation control apparatus according to claim 1, wherein said power control circuit stops restricting said power generation amount, and increases said power generation amount at a predetermined change rate when said detected temperature falls below said predetermined reference temperature.

4. The vehicle-use power generation control apparatus according to claim 3, wherein said power control circuit increases said power generation amount at a rate depending on a difference between said detected temperature and said predetermined reference temperature when said detected temperature falls below said predetermined reference temperature.

5. The vehicle-use power generation control apparatus according to claim 1, wherein said power control circuit restricts said power generation amount at a rate proportional to a difference between said detected temperature and said predetermined reference temperature.

6. The vehicle-use power generation control apparatus according to claim 1, wherein said power control circuit sets said change rate to a smaller value as said detected temperature becomes higher.

7. A vehicle-use power generation control apparatus for controlling an operation of a vehicle generator comprising:
   a temperature detecting circuit detecting a temperature of a predetermined place reflecting a temperature of said vehicle generator;
   a power control circuit that restricts a power generation amount of said vehicle generator such that said power generation amount gradually changes below a predetermined value at a change rate depending on said detected temperature, when said detected temperature exceeds a predetermined reference temperature; and
   a switching element driven by said power control circuit to on/off control passage of an excitation current to an excitation winding of said vehicle generator so that an output voltage of said vehicle generator is regulated at a target voltage, said power control circuit being configured to variably adjust at least one of a value of said target voltage and an upper limit of said excitation current to vary said power generation amount irrespective of said output voltage.

8. The vehicle-use power generation control apparatus according to claim 7, wherein said power control circuit is configured to restrict said power generation amount of said vehicle generator at a rate depending on a difference between said detected temperature and said predetermined reference temperature.

9. The vehicle-use power generation control apparatus according to claim 7, wherein said power control circuit stops restricting said power generation amount, and increases said power generation amount at a predetermined change rate when said detected temperature falls below said predetermined reference temperature.

10. The vehicle-use power generation control apparatus according to claim 9, wherein said power control circuit increases said power generation amount at a rate depending on a difference between said detected temperature and said predetermined reference temperature when said detected temperature falls below said predetermined reference temperature.

11. The vehicle-use power generation control apparatus according to claim 7, wherein said power control circuit restricts said power generation amount at a rate proportional to a difference between said detected temperature and said predetermined reference temperature.

12. The vehicle-use power generation control apparatus according to claim 7, wherein said power control circuit sets said change rate to a smaller value as said detected temperature becomes higher.

* * * * *